Sept. 10, 1968 — R. L. CARLSON — 3,400,440
METHOD OF MAKING AND RECONDITIONING BALL VALVES
Filed March 18, 1964 — 3 Sheets-Sheet 1
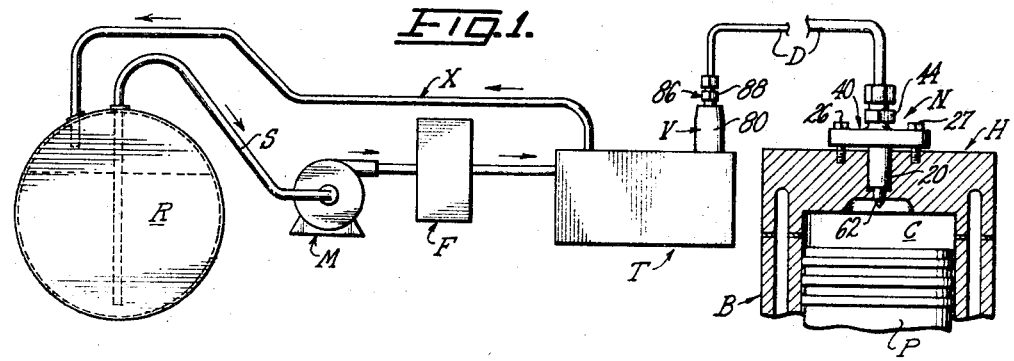
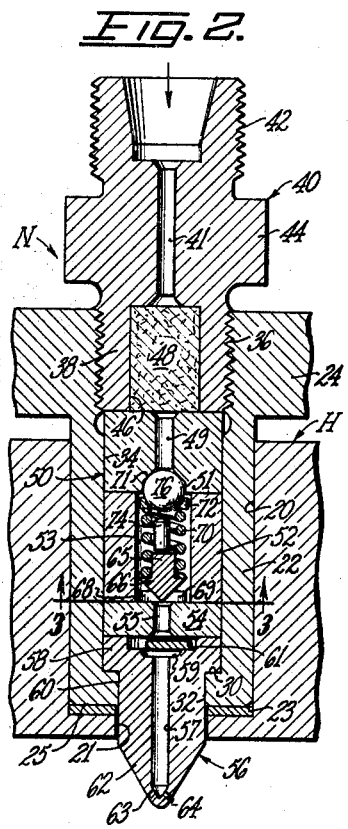
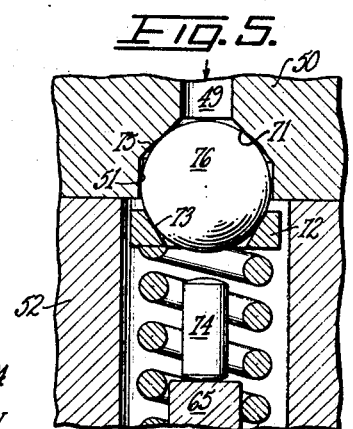
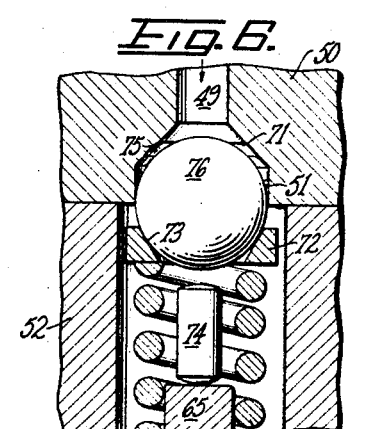
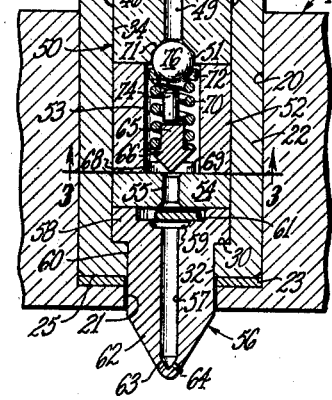
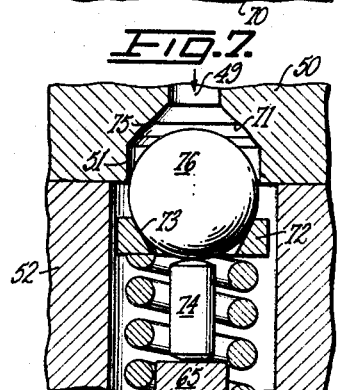
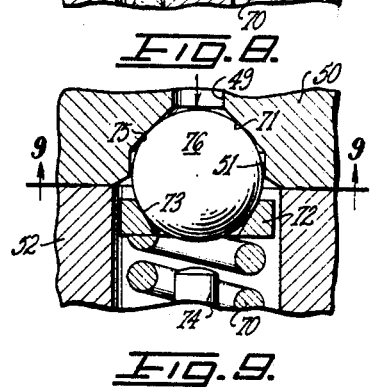
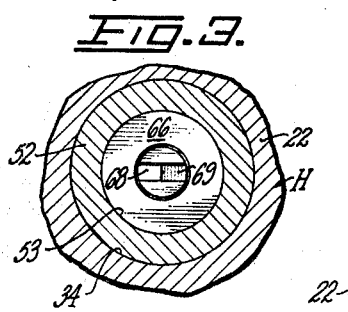
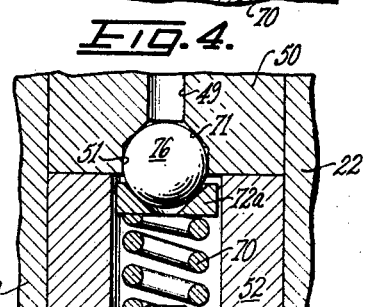
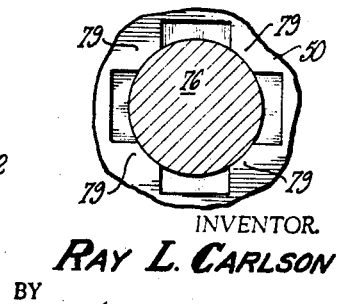
INVENTOR.
RAY L. CARLSON
BY
*Howard L. Johnson*
ATTORNEY Sept. 10, 1968      R. L. CARLSON      3,400,440
METHOD OF MAKING AND RECONDITIONING BALL VALVES
Filed March 18, 1964      3 Sheets-Sheet 2
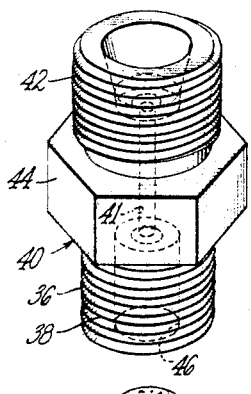
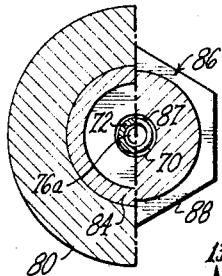
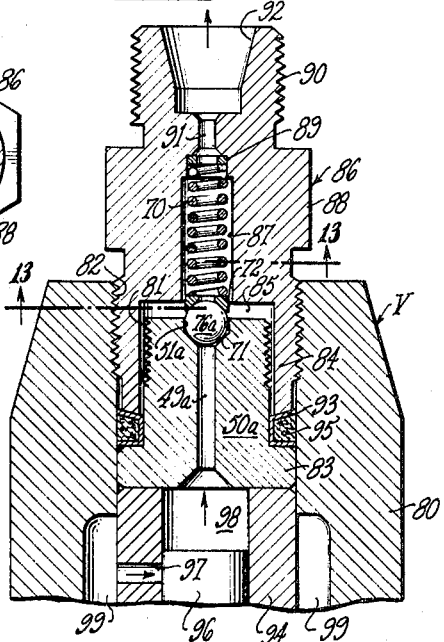
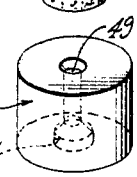
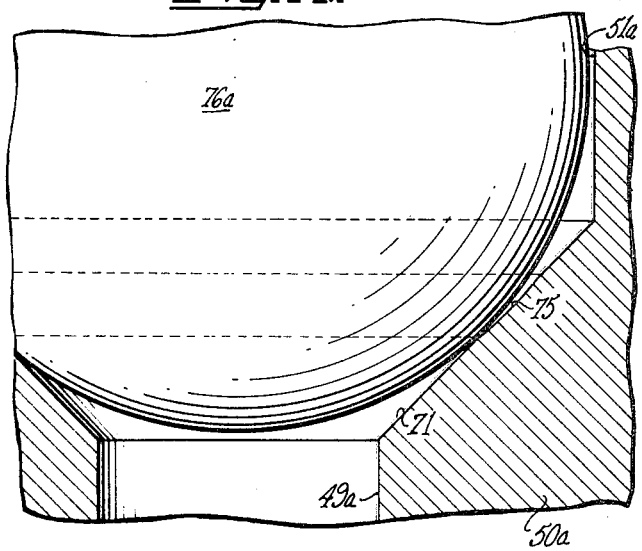
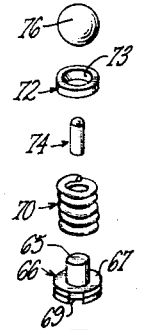
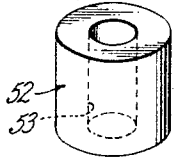
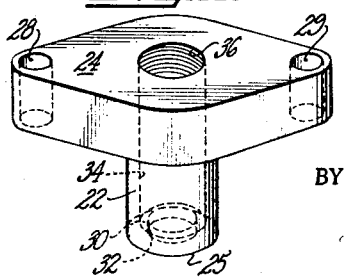
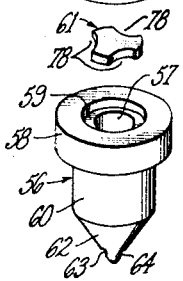
INVENTOR.
RAY L. CARLSON
BY
*Howard L. Johnson*
ATTORNEY Sept. 10, 1968 R. L. CARLSON 3,400,440
METHOD OF MAKING AND RECONDITIONING BALL VALVES
Filed March 18, 1964 3 Sheets-Sheet 3
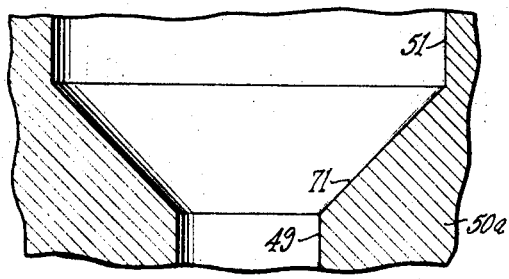
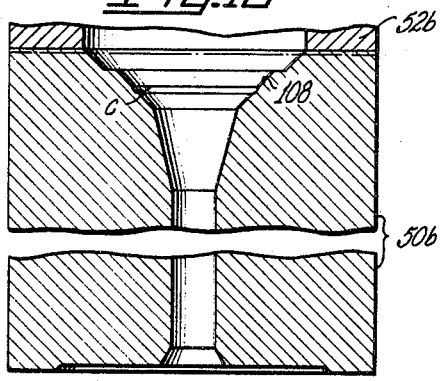
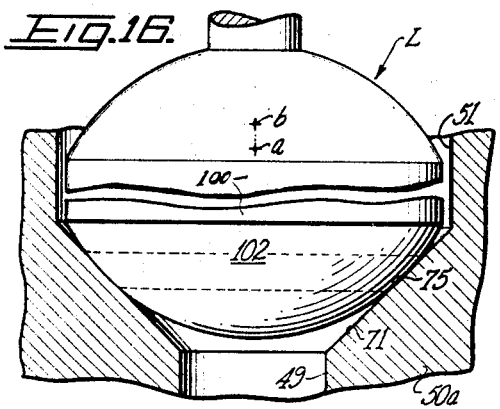
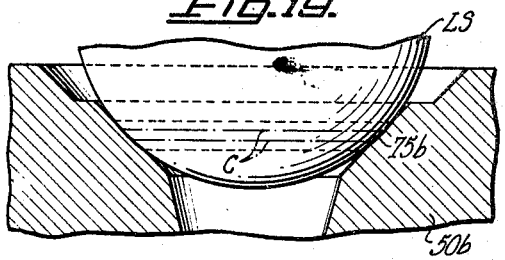
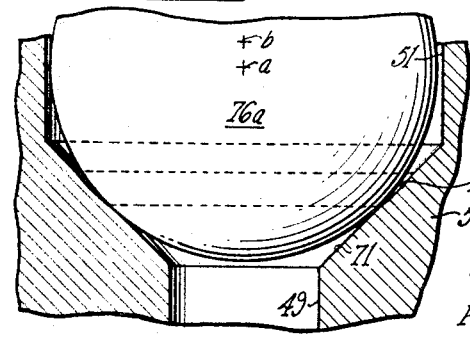
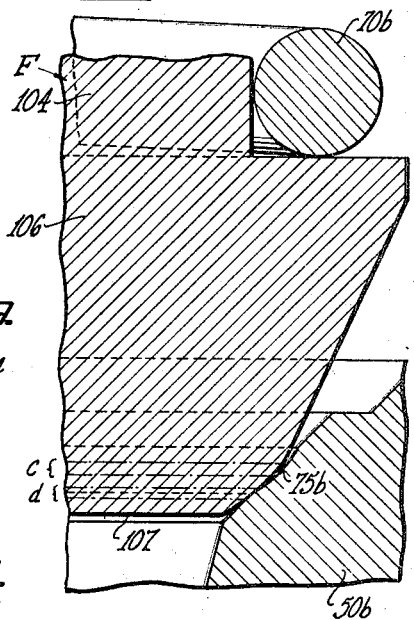
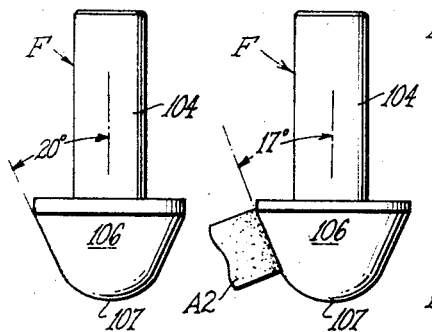
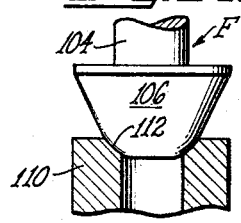
INVENTOR.
RAY L. CARLSON
BY
*Howard L. Johnson*
ATTORNEY

United States Patent Office 3,400,440
Patented Sept. 10, 1968

3,400,440
METHOD OF MAKING AND RECONDITIONING
BALL VALVES
Ray L. Carlson, Rolling Hills, Calif. (% Lavette Engineering & Manufacturing Co., 1400 240th St., Harbor City, Calif. 90710)
Filed Mar. 18, 1964, Ser. No. 352,836
4 Claims. (Cl. 29—157.1)

This invention relates to ball-type valves, and among other advantages, it particularly provides a simple and highly effective construction for guiding and seating a free ball valve, as distinguished from a dome-headed valve (which in some cases may be hemispheric). However the seating construction can also advantageously be used for dome-headed or stemmed valves. By way of illustration, the present construction may be embodied in check valves and is especially adapted for use in high-speed injection nozzles, such as those employed in internal combustion engines.

Theoretically, ball valves should provide an excellent seal, since their spherical shape or uniform curvature in any direction would allow them automatically to seat without the need of rotational or other alignment. However, experience has demonstrated that although a loose ball (spring-urged) would always find its seat eventually, it would not necessarily do so repetitively in the same time interval or by the invariably shortest route. This is especially true in the presence of turbulent flow. Accordingly, the ball valve was then combined with a guide stem, and the curvautre of the head could be limited to a hemisphere since it was no longer free rolling; or merely the annular contact or seating area need be spherical or arcuate as in a "dome-shaped" valve. However the attached stem itself then required guidance; and in addition it was also subject to possible fracture or severance under operating conditions. Further, the self-aligning property of a free ball was lost, and the stemmed ball began to pound itself a new seat (or remain incompletely seated) whenever the true alignment of the stem changed slightly. Also, the mass added by the valve stem, increased the battering-ram effect exerted by the unit against the seat at each closing.

When free balls were replaced by "ball-headed" or "dome-headed" valves (usually with a fixed stem), it was then too frequently observed that they pounded a progressively larger seat area, with the result (aside from leakage) that the pressure drop necessary to effect reseating increased considerably, with resulting inefficiency and ultimate mechanical failure.

Now by the present construction, the possibility of these defects is minimized or eliminated. In addition to being more efficient and longer lasting, the instant construction is essentially simpler and hence more economical to fabricate. A further advantageous feature of construction makes possible a short, automatic retraction of the column of liquid remaining (downstream from the valve) in the nozzle unejected at each cut-off, so that it thus clears the nozzle apertures of liquid upon each valve closure, thereby eliminating (in engine operation) the possibility of fuel combustion in the nozzle aperture itself which might otherwise carbonize and progressively clog the same. Such construction accordingly provides a dripless nozzle which is particularly adapted to efficient high-speed injection of the same metered quantity of (liquid) fuel at each stroke.

Specifically, in a preferred embodiment, a coil spring and free ball valve are still used, but in addition (1) a separate or unconnected stem is axially located within the coil spring, serving both to prevent the spring from ever being closed solid, and also as an abutment or limit means (in addition to that provided by the compacted spring) for the ball valve when in fully open position, (2) when seated, the ball is snugly disposed at the end of a short, cylindrical channel of only slightly larger diameter, and along which the ball is thus wipingly movable so as to exert a piston or plunger-like effect when seating. By another modification (with or without the piston effect), the cylindrical channel wall can be extended lengthwise downstream to form a circle of embracing guide-fingers for the ball, with the openings between the fingers providing lateral fluid outlets for the flowstream when the ball is in "open" position.

Essentially the flow channel is "closed" when the circumference of the ball enters the cylindrical channel; and as it then moves (spring-urged and countercurrent) lengthwise along the channel to its final seating position across the fluid inlet end, such essentially plunger action retracts the entire column of liquid in the line, thus clearing the outlet nozzle and producing a dripless cut-off. In addition, the "piston" channel provides positive guide means in seating the free ball, which does not have its weight increased by that of a connected stem, and the particular seating configuration further cushions the seating impact by means of a fluid wedge.

Such construction embodied in an outward-opening socket housing for the ball valve, when incorporated in a fuel injection nozzle obtains enhanced efficiency from the action of combustion pressure (from the engine) assisting the valve to a tight fit in its seat (hence the spring-pressure need not be as great as for an inward-opening valve); but the valve element itself is spaced away from the maximum combustion temperature of the engine.

Since such ball valve nozzles can be built with much smaller diameters, this permits more freedom in engine cylinder head design; the narrow seat width which makes possible low differential between opening and closing pressures for the valve, permits accommodation to varied engine characteristics; the positive guide means provided for uniform (time of) reseating insures continuous delivery of the same metered amount of fuel in each cycle; "leakoff" lines are eliminated from the nozzle; etc. The invention also provides a new seating configuration (and means for making the same) which can be used advantageously with the present "piston-ball" valves, and also used to recondition worn "dome-headed" valves by a simplified procedure.

It is within the province of the disclosure to improve generally, and to enhance the utility of devices of that type to which the invention pertains. The objects of my invention thus include the achievement of the advantages set forth and to accomplish other ends as will hereinafter be explained or made apparent.

In the drawings which illustrate presently preferred embodiments of my invention FIGURE 1 is a vertical sectional view taken through the upper part of a combustion chamber of an engine, with the piston head and my mounted injection nozzle seen in elevation, and associated fuel reservoir, filter and pump means shown schematically;

FIGURE 2 is an axial sectional view taken through the mounted injection nozzle and adjacent structures, with the ball valve and separate stem seen in elevation;

FIGURE 3 is a transverse sectional view taken along the line 3—3 of FIGURE 2;

FIGURE 4 is an enlarged axial sectional view taken through the valve assembly, showing a modified form of spring-carried seating annulus for the ball valve (seen in elevation) and without a separate stem within the coil spring;

FIGURES 5—6—7 are axial sectional views similar to

FIGURE 4, showing successive stages of a fluid injection cycle, but with the seating annulus and separate stem of the construction of FIGURE 2;

FIGURE 8 is a similar view showing a modified form of the seating structure of the valve housing, wherein portions of the guide channel are removed from the outlet end;

FIGURE 9 is a transverse sectional view taken along the line 9—9 of FIGURE 8;

FIGURE 10 is an exploded perspective view (seen from above) of the several components which are housed within a nozzle casing;

FIGURE 11 is a perspective view of the injection nozzle casing itself on a smaller scale;

FIGURE 12 is an axial sectional view of the delivery valve of the injection pump of FIGURE 1;

FIGURE 13 is a staggered, traverse sectional view taken along the line 13—13 of FIGURE 12;

FIGURE 14 is an enlarged, fragmental axial sectional view taken through the seating structure of FIGURE 12 and with the seated ball valve (seen in elevation) particularly showing its relation to the curvature of the arcuate-faced seat;

FIGURES 15, 16, 17 are axial sectional views taken through the present valve seat structure at successive stages of its formation, beginning with the initial conical configuration of FIGURE 15; FIGURE 16 shows a spherical-ended lapping tool (in elevation) positioned to form an arcuate seating groove of corresponding curvature in the conical area; FIGURE 17 shows a ball valve of different curvature seated in the arcuate groove formed by the previous lapping tool;

FIGURE 18 is an axial sectional view taken through a prior form of valve seat (for a dome-headed valve) which can have its seat resurfaced to provide the present seat configuration for reuse with the old-type (reconditioned) valve;

FIGURE 19 is an enlarged axial view of the seat of FIGURE 18 showing a spherical lapping tool removing the previous surface configuration and reforming it as an arcuate seating groove;

FIGURE 20 is a fragmental axial sectional view, further enlarged, of the reconditioned dome-headed valve seated in the resurfaced valve seat of FIGURE 19;

FIGURES 21–24 show successive steps in reconditioning a dome-headed valve (shown in side elevation) for use with the resurfaced valve seat of FIGURES 18–20; FIGURE 21 shows the worn valve; FIGURE 22 shows an abrasive member applied to the rotating valve head to form a conical surface; FIGURE 23 shows an abrasive element applied to the rotating valve head to shorten and blunt the end thereof; and FIGURE 24 shows formation of an arcuate seating area at the smaller end of the conical surface by means of a tubular abrasive member applied to the end of the rotating valve head.

My valve construction is here particularly exemplified by reference to its incorporation in an injection nozzle assembly and in a fuel delivery pump of an internal combustion engine, which may be compression ignition or spark ignition type. It is to be understood however, that use of the present ball valve construction is not limited to its employment in engines, nor to its use in liquid conduits but it also is utilized in gas conveying conduits, whether high pressure lines or vacuum lines.

As depicted in FIGURE 1, my injection nozzle N is mounted in a socket 20 of the head H of an engine block B with its delivery tip or nose 62 located to eject spurts of (liquid) fuel into the combustion chamber C above the piston P. A fuel reservoir R is shown connected by a supply line S successively to a motor-drive pump M, a filter unit F, and a fuel injection pump T, with a return line X leading back to the reservoir. From the engine-synchronized or timed injection pump T, metered quantities of fuel are moved through a pump valve V and delivery line D to the nozzle N for consecutive injection into the combustion chamber C. Construction of the pump valve V is shown in FIGURES 12–13.

As illustrated particularly in FIGURES 2, 10, and 11, the fuel injection or nozzle assembly N is composed of a generally cylindrical, tubular casing 22, insertable into the mounting socket 20, and having a diametrically flanged portion 24 adapted to separatingly overlie the head H of the engine block and to be firmly (but removably) secured thereto as by bolts 26, 27 inserted through the openings 28, 29. At its distal end the casing 22 internally is formed with a generally radially directed, annular shoulder 30 which surrounds a central opening or outlet 32. Lengthwise from the distal shoulder 30 up to the proximate end, the cylindrical bore 34 is smooth except for an internally threaded, entry length 36 which is adapted to engage the threaded, distal end 38 of a longitudinally apertured, filter housing 40.

The filter housing 40 thus serves to close the proximate end of the casing 22, and is similarly threaded at its opposite end 42 for coupling to the fuel delivery line D, with an intermediate, externally polygonal section 44 for engagement by a wrench or similar tool (not shown). Internally, the threaded distal portion 38 is counterbored to form an end-opening chamber 46 for retention of a pack of removable filtering material 48, such as steel wool.

Within the smooth bore 34 of the casing are lodged in successive end abutment (held in tight longitudinal registration with each other by the inserted filter housing 40): a cylindrical, axially-channeled valve body 50, a tubular, axially-bored spring housing 52, an annular spacer disk 54, and a longitudinally-apertured nozzle element 56.

The removable nozzle element 56 is formed with an annular, outwardly flanged portion 58 which is frictionally supported upon the inner face of the casing shoulder 30, with a cylindrical body 60 frictionally projecting successively through the casing outlet 32 and through an aligned opening 21 in the engine head H so as to dispose a frusto-conic nose or tip 62 in position to eject fuel into the combustion chamber C through its spray apertures 63, 64. A (metal) gasket 23 (FIGURE 2) may be disposed between the floor of the mounting socket which is proximate to the socket outlet-opening 21 and the end 25 of the casing 22. The proximate face of the flanged portion 58 is formed with a top-opening, axially-stepped, central recess 59 in which a back-stop valve 61 is loosely disposed. Essentially the back-stop valve 61 (FIGURE 10) is an edge-scolloped, triangular shaped, flat-faced plate or wafer which is capable of limited axial displacement (within the recess 59) in response to axial movement of fluid through the nozzle aperture 57. In its distal position (i.e. down as viewed in FIGURE 10), fluid flows along the edge-channels 78 from the aperture 55 of the overlying spaced disk 54, into the nozzle aperture 57. Upon counter movement of fluid along the nozzle aperture 57 (for example, combustion products from the chamber C), the wafer 61 is pressed against the underface of the disk 54, blocking the channel 55. The two channels 55 and 57 are thus longitudinally aligned, and axially disposed to the intervening back-stop valve 61. The possible axial displacement of this valve 61 is similar to the "piston displacement" of the ball valve 76, as will be subsequently explained. However it will be seen that the axial reciprocation of this valve 61 does not break the column of liquid on each side of it as long as the liquid moves back and forth an equal distance.

The spring housing 52 consists of a cylindrical planar-ended tube which loosely houses four elements within its smooth, axial bore 53, which bore is of greater diameter than the corresponding bores of the members (50, 54) immediately adjacent either of its ends within the casing 22. The four housed elements are (a) an aligning mount or button 66 having its distal end seated directly upon the adjacent face of the spacer disk 54, peripherally overlying the aperture 55; (b) a coil compression spring 70; (c) a washer 72 adapted to form a ball seat, which annulus or washer is adjustably supported upon the proximate end of the spring so as to be movable axially therewith; (d) a separate stem 74 axially disposed within the coil spring in general alignment with the central opening of the washer so as to contact (upon compression of the spring) a spherical ball valve 76 which is seated upon the washer on the opposite side from the spring.

The alignment button 66 is formed with a short, upstanding axial stud 65 which is received within the coil spring 70, and a peripherally projecting annular ledge or lip 67 which provides an abutment seat for the adjacent end of the spring. The transverse, distal face of the button which overlies the spacer aperture 55 is angularly undercut to form a diametric pair of downwardly-converging channels 68, 69 (FIGURES 2–3) which enable fluid to pass freely between the two central bores 53 and 55.

The cylindrical valve body 50 is formed with adjacent portions of its axial bore having different diameters: a proximate channel length 49 of minimum diameter (similar to the bore 41 of the upstream filter housing 40), and a successive channel length 51 of greater diameter, but nevertheless of less diameter than that of the more distal channel 53 within the downstream, spring housing 52.

The diameter of the intermediate channel 51 is little more than the diameter of the ball valve 76, preferably not exceeding the ball diameter by more than about 1 percent so that it forms a fairly snug, piston-like fit, but leaving the ball capable of being moved lengthwise along the channel, reciprocated by the pump pressure and by the spring pressure respectively. At the entrance end of the channel 51 is located a ball seat, intermediate the axial width of a progressively inwardly-constricted or downstream-diverging, conic area 71 (FIGS. 4–8) conveniently slanted about 45° to the longitudinal axis, and having an arcuate, seating groove 75 (FIGS. 14 and 17) formed around it as will be described below. Accordingly it will be seen that the ball 76 exerts a wiping action in passing along this short, closely embracing, channel length 51 and thus acts as a piston or plunger with respect to the column of fluid on either side of it.

Upon retraction stroke (in response to diminishing pump pressure) the valve seats by spring-action, and the piston action of the ball 76 causes the column of unexpelled liquid which fills the successive longitudinal bores up to the ejection apertures 63, 64, to be sucked or drawn back therefrom (as an unbroken column) so as to produce a dry or "dripless" nozzle tip 62. This linear retraction is equal to the piston movement of the ball 76 along the channel 51, which distance resembles the simultaneous axial displacement of the valve wafer or plate 61 in the recess 59. The liquid column in the aligned bores 53, 55, 57 thus remains cohesive and unsegmented, and this small (straight-line) retraction of the ball valve 76 suffices automatically to clear the outlet apertures 63, 64 at the end of each liquid (fuel) injection.

It will be appreciated also, that with a system of two or more successive valve assemblies of the present construction in a fluid line, as shown in FIGURE 1, this same amount of retraction of the fluid column may occur for the whole length of the line; that is, the ball valve 76a of the pump delivery valve assembly (FIG. 12) simultaneously has a piston-like retraction of the same magnitude as that of the nozzle valve 76 and the back-stop valve 61. Expressed another way, an unbroken column of liquid from the pump valve V to the spray apertures 63, 64 is reciprocated lengthwise with each pump stroke and cut-off.

Distally, the ball valve 76 is seated upon the generally conical, inner face 73 of a washer or annulus 72 which is held loosely upon the adjacent end of the coil spring 70 so that the ball and washer are mutually self-adjusting. In the construction of FIGURE 4 which lacks a separate stem 74, the seating surface of the washer 72a is formed with a more obtuse taper which restricts the ball from projecting axially into the center of the coil 70. In the absence of a stem 74, the compression spring 70 itself provides a limit means for downstream movement of the valve ball 76.

Another modification of construction is seen in FIGURES 8–9 wherein the cylindrical wall of the "piston" channel 51 is partially extended for a short distance downstream (toward the seating annulus 72) to form an interrupted circle of longitudinally aligned, guide fingers 79 between which fluid can pass laterally when the ball 76 is in "open" position. In other words, the fingers 79 extend the guide means of the intermediate channel 51 beyond the point of its "piston-chamber" function, or they may begin far enough upstream in the cylindrical valve body 50 so as to eliminate all possibility of piston action.

The pump delivery valve assembly V (FIGURES 12–13) is constructed similar to the nozzle assembly N as far as the action of the spherical ball valve 76a. A tubular housing 80 is internally threaded at one end 82 for engagement with the inserted end 84 of an axially apertured, spring-cage 86. The latter is formed with an externally polygonal, intermediate portion 88 thus shaped for manipulative engagement by a wrench or similar tool (not shown), and a terminal nipple 90 for coupling to the delivery line D. Internally the intermediate portion is formed with a cylindrical, spring-housing channel 87, radially restricted at its downstream end to retain an abutment annulus 89 against one end of the compression spring 70, the channel 87 then joining an outlet mouth 92 by way of a short, connecting passage 91. The opposite or upstream end of the channel 87 opens into a central cavity 85 within the externally threaded end 84.

Within the outer, tubular housing 80, an inner, piston housing 94 is centrally mounted, with a delivery piston 96 functionally located therein, in line with a delivery chamber 98 which is connected by a lateral inlet passage 97 to supply channels 99 which are in communication with the body of the pump T.

Between the delivery end of the piston housing 94 and the spring cage 86 there is located a valve body 50a formed with an axial, entrance channel 49a, and a cylindrically enlarged, outlet channel 51a, connected by an intermediate, conical funnel area 71 which bears an annular, arcuate, seating groove 75 for the ball valve 76a. The downstream end of the valve body 50a is radically reduced and externally threaded at 81 (for engagement by a threaded socket tool in removal). An annular shoulder or peripheral flange 83 is frictionally overlaid by a generally annular (copper covered), gasket 95 which upon assembly may be compressed by abutment with the adjacent end 93 of the threaded, tubular end 84 of the spring cage. As before, a washer 72 adjustably supported by one end of the spring 70, provides a seating annulus for the ball valve 76a. As in the earlier described valve assembly of FIGURE 2, the ball forms a piston-like fit in the intermediate channel 51a, which short channel is of greater diameter or width than the upstream channel 49a and of less width than the distal channel portion 85 immediately downstream.

Starting with the conical funnel area 71 at the end of a cylindrical bore 51 (FIGURE 15), the present arcuate seating groove 75 may be simply formed by rotation of the inserted lapping tool L of FIGURE 16, which tool has a cylindrical body 100 and a spherically curved head 102 having a radius greater than that of the body 100 (that is, greater than the radius of the bore 51). Thus, a complete sphere formed with the radius of the head curvature (which is spherical but not a complete hemisphere) could not be inserted into the bore 51. Somewhat exaggerated (by enlargement), the radius of the bore 51 or ball 76a is located along the longitudinal axis at a, while the (larger) radius of the head is located at b. For example, in forming a seating groove for a valve ball of approximately 0.094 inch to 0.3125 inch diameter, the lapping head 102 may have a radius of approximately 0.0005 inch to 0.001 inch larger than the valve ball. Several lapping compounds of progressively finer composition may be used. The body 100 of the tool L can be shaped by removing a band of material from about a whole sphere of which the head 102 originally formed a part.

The valve seat and valve ball are generally of the same material (e.g. first quality, ball bearing steel of approximately 64 Rockwell "C"). When a new valve assembly begins operation, the high contact stress around the seat soon results in the ball "coining" the contact band into a thin line or circle which intimately matches the curvature of the valve ball and produces a tight seal which because of its (axial) thickness constantly responds over a protracted period of continued use to a small differential between the opening and closing pressures. Instead of lapping with the tool L of FIGURE 16, it may be used (by longitudinal reciprocation) to "coin" a (somewhat less satisfactory) seating groove 75 of the same general configuration, particularly if the valve seat were of slightly more maleable material than the tool L.

FIGURE 18 shows an old-type valve body 50b worn in use with the dome-headed valve F of FIGURE 21, which valve is normally mounted in a tubular valve cage 52b with its fixed stem 104 centered within a compression spring 70b. The head 106 has worn a wide, seating band c (FIGURE 20) in the terraced seating structure 108, with the result that a large differential exists between the opening pressure (e.g. 1200 lb./in.$^2$) and the closing pressure (which has decreased from an initial 1150 lb./in.$^2$ to perhaps 900 lb./in.$^2$ before being discarded). The valve head (as well as the valve seat) has become pitted and spalled from fatigue factors; there is leakage and increasing malfunction resulting in termination of use of the assembly. Such an assembly can be reconditioned to provide even longer life-span than that of the original, by the present process.

Accordingly, the surface of the worn seating area is erased or expurged by lapping it with a spherical headed lap LS (FIGURE 19) which reforms it to an annular seating band having the arcuate curvature of the lap. Separately, the worn, dome-headed valve head 106 has its apical end 107 shortened and blunted somewhat, as by rotating the valve F against a terminally disposed, abrading element A (or vice versa). The generally conical or tapered side of the valve head has its surface irregularities removed and its slant made somewhat more acute (reduced from about 20° to about 17½° in the example of FIGURES 21–22) by abrasion or lapping with another abrasive element A2, conveniently by rotating the valve F thereagainst.

The shortened and laterally smoothed head 106 is then lapped against a coaxially disposed, tubular lap 110 of FIGURE 24 wherein the annular, dished, contact area 112 is formed with the radius of a smaller sphere than the spherical lap LS of FIGURE 19. The result is formation of an arcuate seating groove 75b (FIG. 20), like the previous groove of FIGURES 14 and 17, in which the valve head 106 makes a tight seal with a narrower contact area d, and hence remains operative and efficient for a long life, at a small differential between opening and closing pressures. The spring cage 52b can be shortened as indicated by the broken line FIGURE 18, in order to restore the original measure of spring tension which may have been diminished or unloaded by shortening the apical end 107 of the valve. Such reconditioned valve assemblies may then have a useful life considerably longer than that of the original assembly. Alternate to shortening the spring cage 52b, a longer spring 70b could be substituted.

It will be seen accordingly that by either the method of reconstruction or by the original fabrication (FIGURE 16), there is provided an annular, arcuate, seating groove 75, 75b adapted to form a thin line, arcuate contact with the arcute seating band of different radius of a free (spherical) ball or of a dome-headed valve. Upon seating, there is then a thin arcuate wedge-shaped space located between the valve and seat, jointly defined by the two spherically curved, diverging sides of different radii, and adapted to be filled by fluid (of the flowstream) which thus cushions the seating impact of the valve head and tends to hold the induced stress (Hertz stress) below the fatigue limits of the materials. Such result is of course independent of the piston effect of a free ball valve, which effect is not obtained (or intended) with the old-type, valve assemblies of FIGURES 18, 21, whether reconditioned or not.

From the foregoing, the construction and operation of the depicted device will be readily understood and further explanation is believed to be unnecessary. However, since numerous modifications and changes will readily occur to those skilled in the art, it is not desired to limit the concept to the exact construction shown and described by way of example; and accordingly all suitable modifications and equivalents may be resorted to, falling within the scope of the invention as hereafter claimed.

I claim:
1. The process of forming a valve assembly which comprises:
   providing a pair of tubular conduit lengths having different bores disposed end to end with a generally funnel-shaped area connecting the bores at their common end, at least the larger bore being cylindrical,
   providing a valve seat within said funnel-shaped area by forming an annular groove generally coaxial to said cylindrical bore and characterized by arcuate curvature of a theoretical sphere of a diameter larger than a sphere which would pass along said cylindrical bore,
   providing a spherical ball valve of a diameter which will just snugly move lengthwise along said cylindrical bore and seat against said annular groove with a thin, annular, line-contact thus formed at the converged end of a thin, arcuate, wedge-shaped space which is defined jointly by the two spherical curvatures of slightly different radii, said space being thus adapted to be filled by fluid flow disposed to cushion the ball valve in seating.

2. The process of reconditioning a worn, annular, centrally apertured, valve seat and a mating and correspondingly worn, fluid-pressure-responsive, dome-headed valve of the type disposable within a fluid conduit in association with spring-urged guide means for longitudinal reciprocation along the conduit toward and away from a seating position overlying and closing the central aperture of said valve seat, with an apical end of the valve generally centered in said aperture, which process comprises:
   (1) expurging the existing seating area of the worn valve seat and reshaping an annular area to form a new seating area having an arcute curvature of a theoretical sphere,
   (2) reshaping said dome-headed valve
      (a) by axially shortening said apical end,
      (b) by reshaping the worn, annular seating area surrounding said head adjacent its apical end, to form a conical shape of more acute angle than that of the worn valve,
      (c) by forming adjacent the apical margin of said reshaped conical area, an annular area of arcuate based on a theoretical sphere of slightly shorter radius than the arcuate curvature of said reshaped valve seat,
   whereby a thin, annular, line-contact of less axial thickness than that of the previous contact between the worn valve and the worn valve seat is formed between the reconditioned valve when seated and the reconditioned valve seat, said contact thus being at the converged end of a thin, arcuate, wedge-shaped space which is defined jointly by the two spherical curvatures of slightly different radii, said space being thus adapted to be filled by fluid-flow disposed to cushion the valve in seating.

3. The process of the preceding claim 2 which additionally includes shortening the effective length of an associated cage for said spring-urged guide means, thereby to compensate for decreased spring tension resulting from axially shortening the apical end of said dome-headed valve.

4. The process of forming a valve seat for a generally semispherical valvehead of the type adapted to seat itself in an outward-opening, liquid fuel injection valve assembly, which process comprises:
providing a tubular conduit length having a bore of inner diameter which permits relative axial movement therein of such a generally semispherical valve head of slightly less diameter, said bore having a succeeding portion of progressively constricted diameter, and
forming an annular and generally axial valve seat for said valve head in said portion of constricted diameter, which seat is characterized by an arcuate curvature corresponding to a theoretical sphere of a diameter larger than that of said valve head, whereby said valve head may seat therein in such valve seat with a thin, annular line-contact thus formed at the converged end of a thin, arcuate wedge-shaped space which is defined jointly by the two spherical curvatures of slightly different radii, said space being thus adapted to be filled by fluid flow disposed to cushion the valve head in seating.

References Cited
UNITED STATES PATENTS

| | | | |
|---|---|---|---|
| 2,069,153 | 1/1937 | Konkle | 29—157.1 |
| 2,552,658 | 5/1951 | Ackerman | 239—533 |
| 2,560,799 | 7/1951 | Johnson | 29—157.1 |
| 2,628,166 | 2/1953 | Haller. | |
| 2,702,559 | 2/1955 | Bodine | 239—533 X |
| 3,025,005 | 3/1962 | Dafforn et al. | 239—533 X |
| 3,055,593 | 9/1962 | May et al. | |
| 3,107,417 | 10/1963 | Jaquish et al. | 29—157.1 |
| 3,249,308 | 5/1966 | Cadiou | 239—533 X |

JOHN F. CAMPBELL, *Primary Examiner.*

J. L. CLINE, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,400,440                           September 10, 1968

Ray L. Carlson

It is certified that error appears in the above identified patent and that said Letters Patent are hereby corrected as shown below:

Column 8, line 68, before "based" insert -- curvature --.

Signed and sealed this 3rd day of February 1970.

(SEAL)
Attest:

Edward M. Fletcher, Jr.                          WILLIAM E. SCHUYLER, JR.
Attesting Officer                                            Commissioner of Patents